March 24, 1970 H. G. HOOPER 3,502,254

TAPE MAGAZINE

Original Filed May 7, 1964 5 Sheets-Sheet 1

INVENTOR.
Harrison G. Hooper
BY Newton, Hopkins, Jones & Ormsby
ATTORNEYS

INVENTOR
Harrison G. Hooper
BY Newton, Hopkins, Jones & Ormsby
ATTORNEYS

March 24, 1970 H. G. HOOPER 3,502,254

TAPE MAGAZINE

Original Filed May 7, 1964 5 Sheets-Sheet 3

INVENTOR.
Harrison G. Hooper
BY Newton, Hopkins, Jones & Ormsby
ATTORNEYS

INVENTOR.
Harrison G. Hooper
BY Newton, Hopkins, Jones & Ormsby
ATTORNEYS

March 24, 1970 H. G. HOOPER 3,502,254

TAPE MAGAZINE

Original Filed May 7, 1964 5 Sheets-Sheet 5

INVENTOR.
Harrison G. Hooper
BY Newton, Hopkins, Jones & Ormsby
ATTORNEYS

United States Patent Office 3,502,254

Patented Mar. 24, 1970

3,502,254
TAPE MAGAZINE

Harrison G. Hooper, 2101 Enon Road SW., Atlanta, Ga. 30331

Continuation of application Ser. No. 591,909, Nov. 3, 1966. This application July 23, 1968, Ser. No. 751,672
Int. Cl. B65h *23/00*
U.S. Cl. 226—196 8 Claims

ABSTRACT OF THE DISCLOSURE

What is disclosed herein is a tape magazine in which tape is stored in a random serpentine manner and which includes a tape guide channel extending from the lower end of the magazine to a feed means at the upper end of the magazine and a displacing means for separating the tape from the bottom of the magazine as the tape moves across the bottom and into the tape guide channel. The tape guide channel serves as a first tape guide means and the tape magazine is disclosed as also having a second tape guide means for guiding the tape from the tape guide channel toward the feed means and a third tape guide means for guiding the tape from the feed means into the upper end of the magazine.

CROSS REFERENCE TO RELATED APPLICATIONS

This application is a continuation of application Ser. No. 591,909 filed Nov. 3, 1966 and now abandoned, which in turn was a division of copending application Ser. No. 365,759 filed May 7, 1964 for "Circuit Control Device," now U.S. Patent No. 3,321,590.

It has long been common practice to provide for the selective timed initiation and termination of circuit energization by devices using a program tape continuously moved by a time controlled mechanism. Conventionally, such devices include current conducting feelers or other sensing elements in continuous contact with the tape. The tape is formed with program data which cooperates with the sensing elements as the tape is fed and selected circuits are selectively energized in timed sequence in accordance with the program data on the tape.

Frequently the program data is in the form of perforations in the tape, in which case a conductive member over which the tape passes is located in opposed relation to the sensing elements on the opposite side of the tape. With this arrangement, as a perforation in the tape registers with a sensing element, the sensing element extends through the tape to contact the conductive member and establish a circuit to effect the time controlled energization of a specific signal circuit.

Many difficulties have been encountered in the manufacture and use of such previous devices. For example, the feelers or sensing elements must be conductive components of an electrical circuit. This requires that sensing elements be formed of conductive material which is frequently expensive and lacking in desired physical strength. Further, the mounting of such conductive components requires individual insulation for each conductive component and results in structures which are complex, delicate and readily susceptible to frequently required repairs.

Difficulty has also been encountered with respect to the establishment of full contact between the feelers and the conductive member on the opposite side of the tape and the requirement for an insulated mounting for the conductive member has posed problems. Moreover, the continuous contact between the feelers and the tape causes wear and deterioration of the tape while the accumulation of foreign matter on the feelers frequently inhibits the electrical responsiveness of previous devices.

SUMMARY OF THE INVENTION

The present invention seeks to overcome these and other difficulties encountered with previous circuit control devices by the provision of pivotally mounted positively movable feeler fingers which are not in themselves conductive but which are movable upon movement of a tape perforation into registration therewith. Movement of a finger actuates a circuit control switch for an individual circuit to be controlled by that finger. The present invention further provides a tape controlled circuit control device in which the fingers do not continuously bear against the tape, but are only in periodic contact with the tape.

Since the fingers are not conducting elements in the circuit to be controlled, they are formed of rugged durable material and are of sturdy construction. Since the circuit control switches are separate from the fingers, conventional voltages may be utilized without requiring transformers as is usually the case when the fingers are conductive components.

A further feature of the present invention is the provision of means for feeding the tape by successive step by step movements, as distinguished from the continuous tape movement heretofore employed. The periodic contact of the fingers with the tape occurs between intervals of tape movement and as a result, frictional contact between the moving tape and the fingers is completely avoided. Moreover, when the periodic contact of the fingers with the tape results in a finger entering a perforation in the tape, the total finger movement is sufficiently large to permit use of circuit control switches of conventional type so as to avoid the necessity for delicate mechanisms responsive to very limited finger movement.

Another important feature of the present invention is magazine type feed arrangement for an endless tape. The arrangement permits tapes to be readily exchanged or removed for alteration of the data provided thereon. The tape feed in combination with the tape magazine provides for feeding the tape into and out of the tape magazine by a single driven sprocket in such manner as to minimize the exposed area of the tape at any point in its travel. Moreover, the invention further provides for the use of a single synchronous motor for both driving the sprocket wheel and controlling periodic finger movement so as to insure cooperation between tape and finger movement. In addition, the circuitry is such that the device utilizes readily available alternating current voltages without requiring voltage transformers while at the same time permitting the use of such transformers should lower or higher voltages be desired.

From the foregoing it will be readily seen that an object of the present invention is to provide a novel and improved circuit control device. It will also be seen that another object is to provide a control device in which tape is delivered through the device by step by step movement and in which the sensing of the tape data is accomplished between movements of the tape. It is also an object of the present invention to provide a device in which circuits are controlled by movement of the fingers be conductive components in the circuits.

Another object of the invention is to provide a mechanism of the character described which may utilize conventional alternating current voltages without requiring the use of transformers, but in which transformers may be employed, should the control of lower or higher voltages be desired. Other objects of the invention include that of providing for the use of a single synchronous motor for movement of both the tape and the fingers.

These and other objects, features and advantages of the present invention will become apparent from consideration of the following specification when taken in conjunction with the accompanying drawings in which:

DESCRIPTION OF THE PREFERRED EMBODIMENT

Figure 1:
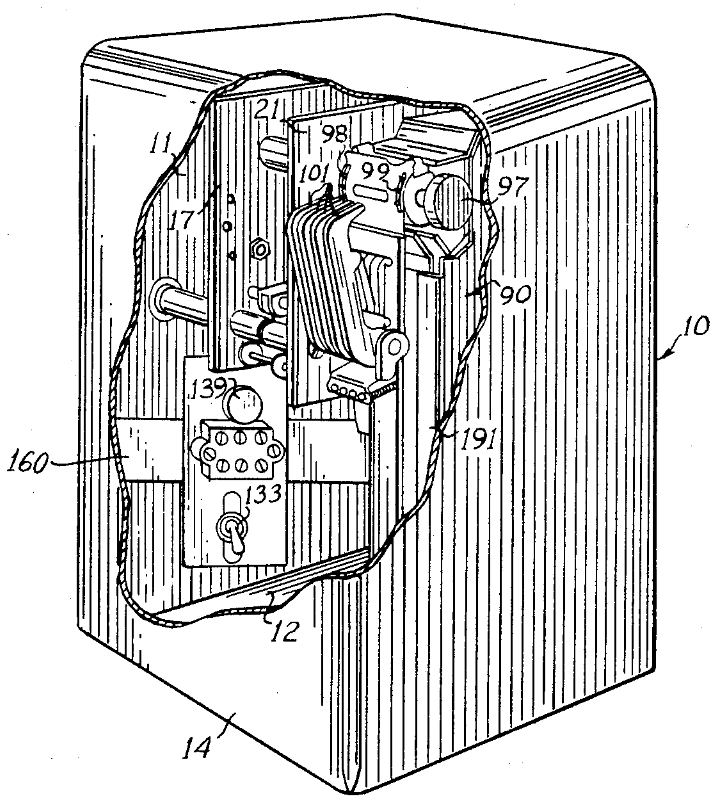
FIG. 1 is a perspective view of an embodiment of the invention with a portion of the cover broken away.
Figure 2:
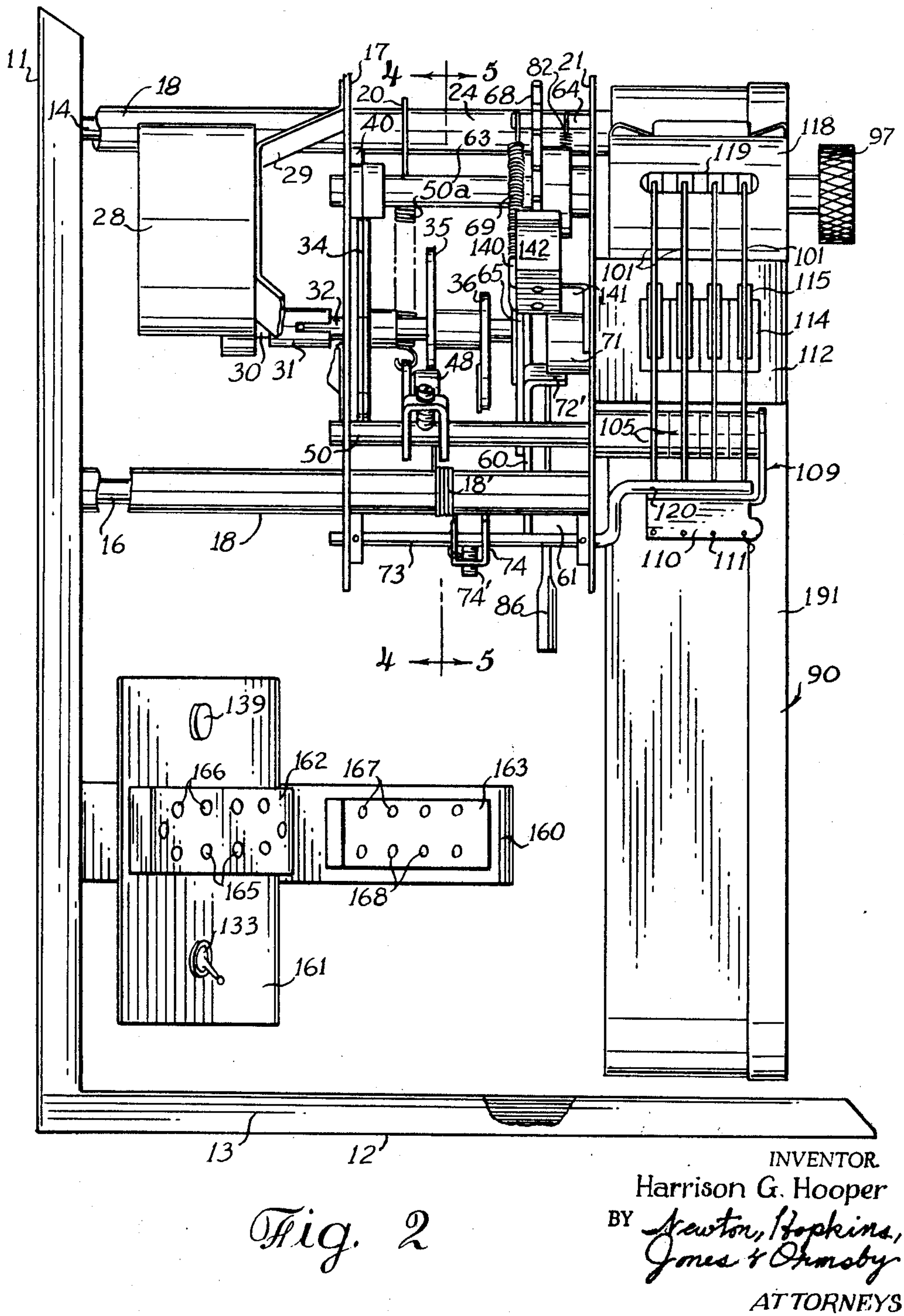
FIG. 2 is a side elevation view of that embodiment of the invention shown in FIG. 1 with the cover removed.

Referring to FIGS. 1 and 2 of the drawings and that embodiment of the invention here presented by way of illustration, the cabinet generally indicated by the numeral 10 includes a vertical mounting plate 11 from which extends a horizontal base 12. Edge flanges 13 of the base 12 receive thereover and frictionally engage the inner edges of the cover 14. From the mounting plate 11 there extend three vertical mounting rods 14, 15 and 16 which together support the operative mechanism of the invention. Spaced from the mounting plate 10 and parallel thereto is positioned on the rods 14, 15 and 16 a vertical inner bearing plate 17. The inner bearing plate 17 is spaced inwardly from the mounting plate 11 by spacer sleeves 18 on the rods 14, 15 and 16. A vertical outer bearing plate 21 is mounted on the rods 14, 15 and 16 forwardly of and parallel to the bearing plate 17 by spacer sleeves 24, 25 and 26 on the rods 14, 15 and 16 respectively.

A synchronous motor 28 is mounted on the inner face of the inner bearing plate 17 by a bracket 29. In the specific embodiment of the invention described herein, the synchronous motor 28 includes a gear train (not shown) contained within its casing to provide a final drive speed of one revolution per minute for its shaft 30, a coupling 31 and a drive shaft 32 when the synchronous motor 28 is connected to the customary sixty cycle per second voltage source. The drive shaft 32 is journalled in the two bearing plates 17 and 21 and has a plurality of cams secured thereto in spaced relation between the two bearing plates 17 and 21. From left to right in FIG. 2 these cams are a compound duration cam 34, a finger pressure cam 35, and a pawl actuating cam 36.

The compound duration cam 34 is mounted on the drive shaft 32 for rotation therewith at one revolution per minute and it will be seen that it determines the time interval during which a circuit will remain energized after selection and initial energization in response to data on the tape. While various types of cams and cam configurations may be employed for determining the duration of circuit energization in the present embodiment of the invention, the cam 34 is compounded of two relatively adjustable plates **34*a* and 34*b*. Each plate is formed with a peripheral recess 38*a* or 38*b* along approximately ninety degrees of its circumference. The recesses 38*a* and 38*b* cooperatively define a cam dwell 19 not exceeding ninety degrees of the circumference of the cam 34 when the recesses 38*a* and 38*b* are in complete registration. However, the length of the cam dwell 19 can be reduced by changing the relative angular positions of the recesses 38*a* and 38*b* so as to close the gap between remote edges of the recesses 38*a* and 38*b*. A screw 39 retains the plates 34*a* and 34*b*** in the selected angular positions desired.

A switch member such as duration switch 40 is secured to the bearing plate 17 just above the duration cam 34. The duration switch 40 has a cam follower 41 which rides along the periphery of the duration cam 34. When the follower 41 is raised by contact with the outer periphery of either plate **34*a* or 34*b*, the switch is open and precludes energization of any circuit by movement of any finger. When the follower 41 fails within both recesses 38*a* and 38*b*, the switch 40** is closed and a circuit may be energized in the manner described below.

The finger pressure cam 35 is secured to the drive shaft 32 forwardly of the compound cam 34. The finger pressure cam 35 includes a high dwell portion 42 along approximately one-hundreds and eighty degrees of its circumference and a low dwell portion 44. A fast rise portion 45 and a fast fall portion 46 are formed between the dwells 42 and 44. A cam follower 48 is carried by an arm 49 fixed to finger pivot shaft 50 journalled in the bearing plates 17 and 21. The cam follower 48 is urged toward continuous contact with the finger pressure cam 35 by a spring **50*a* extending between the outer end of the arm 49 and a hook 20 engaging the sleeve 24**.

The pawl actuating cam 36 is formed with a fast rise portion 51 of continuously increasing radius terminating in a concave relief surface 52.

Figure 5:
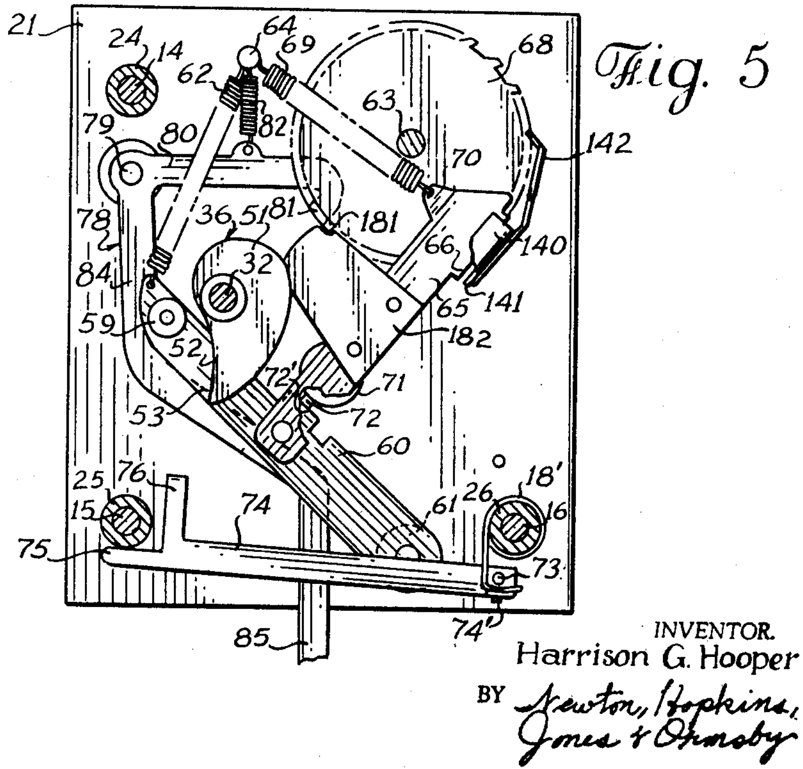
FIG. 5 is a sectional view taken substantially in line 5—5 in FIG. 2.

The cam follower 59 for the pawl actuating cam 36 is carried by an arm 60 pivotally attached to the bearing plate 21 by a boss 61 and urged toward clockwise rotation as viewed in FIG. 5 by a spring 62. The spring 62 is attached at one end to the outer end of the arm 60 and at its other end engages a pin 64 extending from the bearing plate 21.

At approximately the center of the arm 60, a pawl actuator 65 is pivotally connected. At its outer end, the pawl actuator 65 carries a pawl flange 66 which is successively engageable by the teeth of a ratchet wheel 68 mounted on a shaft 63 extending between mounting plates 17 and 21. A spring 69 extends from an ear 70 of the pawl actuator 65 to the pin 64 so as to urge the pawl flange 66 against the ratchet wheel 68. A boss 71 having a projecting set screw 72 extends from the bearing plate 21. The set screw 72 engages a flange 72′ extending from the mid-length of the arm 60 and serves to form an upper limit stop for the arm 60. A guide flange 140 formed at the outer end of a clip 141 fixedly attached to the outer bearing plate 21 is positioned adjacent the pawl flange 66 and serves to maintain the pawl actuator 65 adjacent the ratchet wheel 68 as the pawl flange 66 is engaged by the ratchet wheel 68. A resilient check pawl 142 is attached to the clip 141 and engages the teeth of the ratchet wheel 68 so as to prevent clockwise rotation of the ratchet wheel 68 as viewed in FIG. 5.

Extending from the bearing plate 17 and through the bearing plate 21, a finger retracting shaft 73 is mounted with an arm 74 fixed thereto by a set screw 74′. The arm 74 is urged upwardly by a coil spring 18′ encircling the sleeve 26 and having one end looped over the finger pivot shaft 50 and its other end engaging the arm 74 so as to urge the arm 74 upwardly. A finger 75 extends from the outer end of arm 74 and below the sleeve 25 so that the sleeve 25 limits upward pivotal motion of the arm 74 in response to the spring 18′. A finger 76 on the arm 74 extends upwardly and thence toward the bearing plate 21 so as to be engaged by the arm 60 as the arm 60 moves downwardly.

A bell crank 78 is pivotally mounted on a shaft 79 extending from the bearing plate 21. The upper arm 80 of the bell crank 78 extends substantially horizontally to lie between the ratchet wheel 68 and the bearing plate 21. The outermost end of the arm 80 has a return bend with a pawl 81 at the end. The pawl 81 extends toward the bearing plate 17 so as to engage the teeth of the ratchet wheel 68, and extends beyond the ratchet wheel 68 to engage a notch 181 in an actuating plate 182 fixedly attached to the pawl actuator 65. The actuating plate 182 extends upwardly from approximately the mid-length of the pawl actuator 65 and it will be understood that with clockwise rotation of the bell crank 78 as viewed in FIG. 5, the pawl 81 forces the pawl actuator 65 downwardly and to the left as viewed in FIG. 5. However, a spring 82 connects between the arm 80 and the pin 64 to urge the bell crank 78 in a counterclockwise direction as viewed in FIG. 5. The second arm 84 of the bell crank 78 extends downwardly and over the finger 76 of the arm 74 to provide a handle 85 for manual manipulation of the bell crank 78. The arm 84 strikes and depresses the finger 76 of the arm 74 when the bell crank 78 is rotated in a clockwise direction as viewed in FIG. 5.

The tape magazine 90 here shown as generally rectangular is supported from the outer bearing plate 21. Within the magazine 90 a tape guide channel 91 is formed between the side member or wall 92 and a parallel inner wall 94 to provide a first guide means. The inner wall 94 turns inwardly near the bottom member of the magazine 90 and cooperates with a platform member 95 to form an extension 91' of the guide channel 91 which terminates inwardly and above the bottom of the magazine 90 and which serves as a displacing means for separating the tape T from the bottom of the magazine 90 as the tape T moves into the guide channel 91. A rectangular back wall 190 and a rectangular removable front wall or cover 191 complete the magazine 90 so that the magazine 90 encloses a tape T within the magazine 90. The distance between the substantially parallel back wall 190 and cover 191, when in position on the magazine, is just slightly greater than the width of the tape T to be placed in the magazine.

Figure 6:
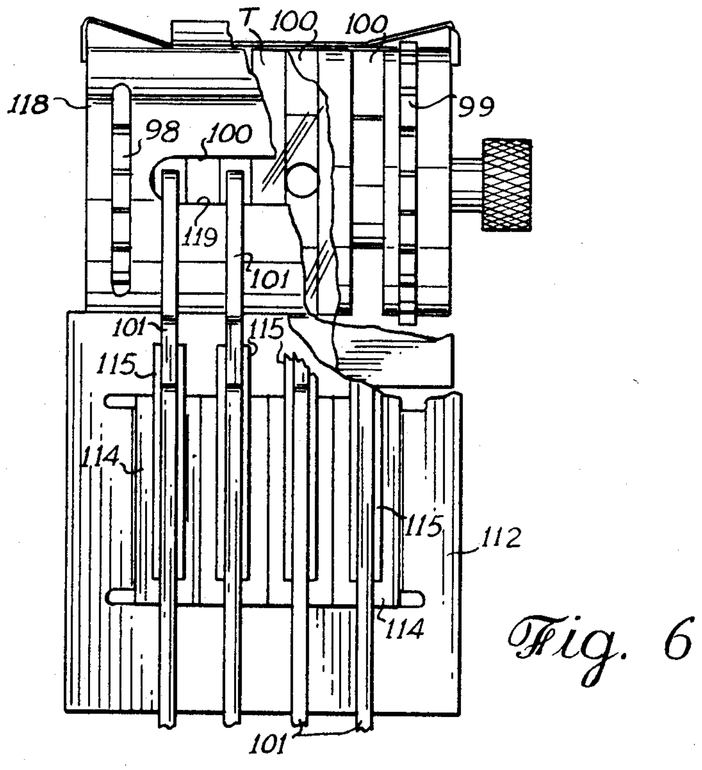
FIG. 6 is an enlarged fragmentary detail view of the sensing and circuit control mechanism.

A drum 96 is provided at the upper left corner of a tape magazine 90 and is mounted on an extension of the shaft 63 which carries the ratchet wheel 68. The drum 96 serves as a feed means and channel members 150 and 151 provide a second guide means which extends the guide channel 91 outwardly toward the lower surface of the drum 96. Channel members 152 and 153 form a horizontal channel 154 into the magazine 90 from that upper surface of the drum 96 tangent to a plane in the horizontal channel 154 and serve to provide a third guide means for guiding the tape T into the magazine 90. The tape T passes through the guide channel 91, out of the magazine 90 and around the drum 96, and thence back to the magazine 90 through the horizontal channel 154. The drum 96 includes a pair of sprockets 98 and 99 at its outer ends which engage appropriately spaced and positioned holes in the tape T to move the tape T with the drumb 96. Between the sprockets 98 and 99 of the drum 96, a plurality of equally spaced circumferential channels 100 are provided as best shown in FIG. 6. With each channel 100, there is associated a sensing element such as a finger 101.

Figure 3:
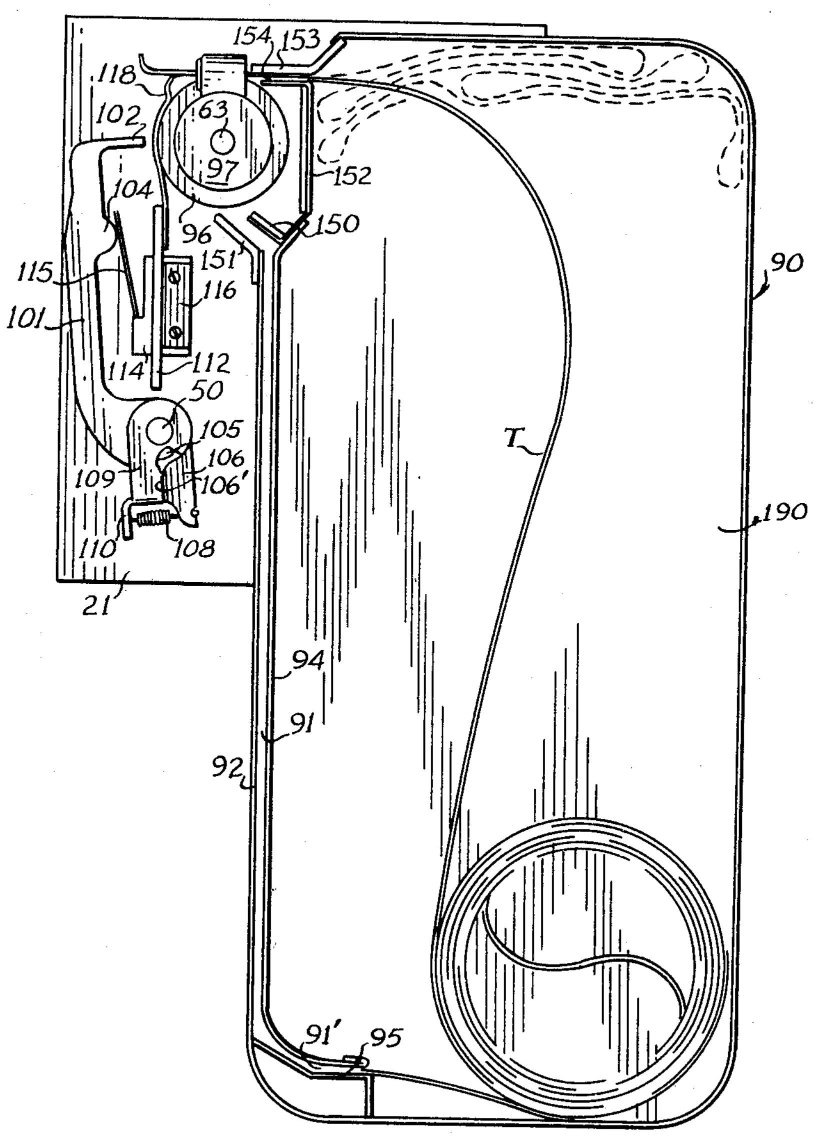
FIG. 3 is a front elevational view of the invention as shown in FIG. 2 with the tape magazine cover removed and with background details omitted for clarity.

Each of the fingers 101 has a tip 102 which is adapted to be pressed against the tape T as the tape T passes around the drum 96. Below the tip 102 of each finger 101, a switch node 104 projects from the finger shank toward the drum 96. The lower end of each finger 101 is fixed to a bearing 105, the bearing 105 being rotatably carried by the extending end of the finger pivot shaft 50. From the lower end of each finger 101, a projection 106 extends downwardly below the finger pivot shaft 50. At the extreme end of the finger pivot shaft 50, a bracket 109 is attached for rotation with the finger pivot shaft 50. The bracket 109 includes a flange 110 extending parallel to the finger pivot shaft 50 and adjacent the bearings 105. Springs 108 engage holes 111 in the flange 110 and extend to engage the projections 106 of the fingers 101. The flange 110 also engages a check edge 106' of each projection 106 so as to prevent the fingers 101 from rotating in a clockwise direction as viewed in FIG. 3 independently of the flange 110. Below the drum 96 and adjacent the switch nodes 104 of the fingers 101, a mounting plate 112 is mounted upon the bearing plate 21. The mounting plate 112 defines an opening to receive a plurality of switch members such as microswitches 114 with their operating levers 115. Flanges 116 formed from the mounting plate 112 support the switches 114, for contact of their operating levers 115 with the switch nodes 104 of the fingers 101. A hood 118 extends from the mounting plate 112 over the drum 96 to protect the tape T as it passes over the drum 96. The hood 118 has a window 119 through which the tape T may be read.

Referring to FIG. 2 it will be seen that the finger retracting shaft 73, journalled by the bearing plates 17 and 21, terminates in a crank 120 which overlaps the projections 106 of the fingers 101. It will thus be seen that as the finger retracting shaft 73 is rotated, the crank 120 will engage the projections 106 of the fingers 101 to rotate them in such a manner that the tips 102 will move away from the drum 96.

A support member 160 is mounted on and extends toward the magazine 90 from the vertical mounting plate 11 beneath the finger retracting shaft 73. A switch plate 161 is carried by the support member 160 and attached thereto is an input terminal block 162. The input terminal block 162 is of known type and serves to electrically connect a lead attached to one of a plurality of input terminals 165 and a lead attached to the appropriate corresponding output terminal 166. Adjacent the switch plate 161 on the support member 160 is an output terminal block 163 which is similar to the input terminal block in that it also serves to electrically connect a lead attached to one of a plurality of input terminals 167 and a lead attached to an appropriate corresponding output terminal 168.

Figure 7:
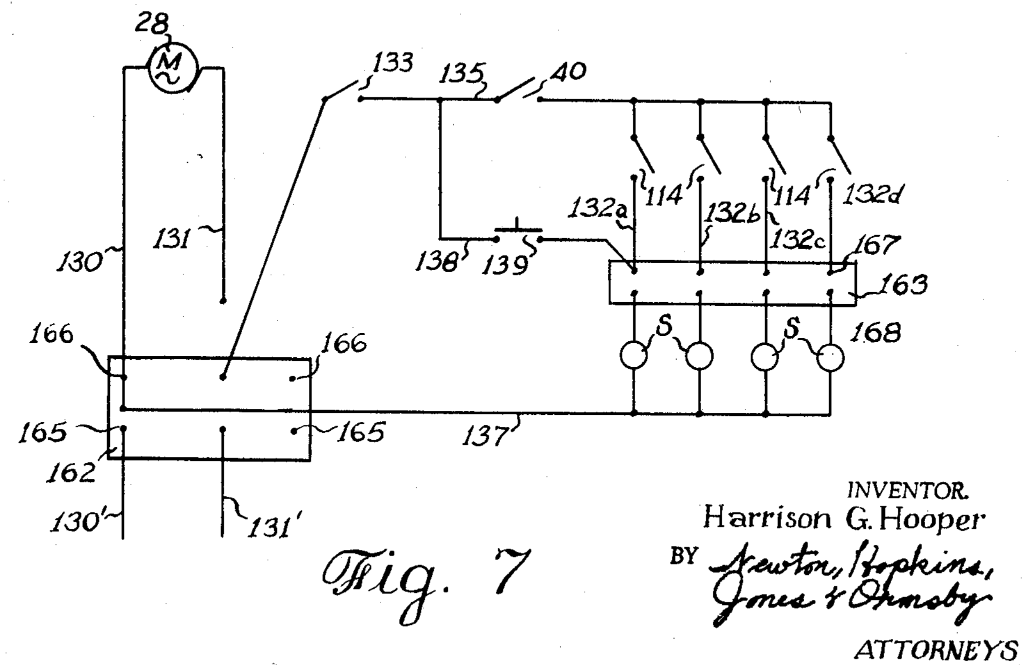
FIG. 7 is a schematic wiring diagram for the invention.

From the schematic wiring diagram of FIG. 7, it will be seen that the synchronous motor 28 is connected between two output terminals 166 of the input terminal block 162 by leads 130 and 131. One terminal of each of the plurality of microswitches 114 is connected in common with a terminal of the other microswitches 114 to a single output terminal 166 of the input terminal block 162 through the duration switch 40 and a control switch 133 by a lead 135.

The control switch 133 is a conventional off-on type and is positioned on the switch plate 161. The second terminal of each microswitch 114 is connected to a different input terminal 167 of the output terminal block 163 from that to which the other microswitches are attached. Thus, when the control switch 133 and duration switch 40 are both closed, an output terminal 166 of the input terminal block 162 is connected to a particular input terminal 167 of the output terminal block 163 through a particular microswitch 141. One of the microswitches 114 and the duration switch 40 are by-passed through an override switch 139 by a lead 138. The override switch 139 is a conventional push-button type switch mounted on the switch plate 161 and it will be understood that with operation of the override switch 139 when the control switch 133 is closed, an output terminal 166 of the input terminal block 162 is connected to an input terminal 167 of the output terminal block 163.

OPERATION

From the foregoing description of an embodiment of the invention, it will be understood that when a customary sixty cycle per second voltage source is applied by leads 130' and 131' to the input terminals 165 corresponding to the output terminals 166 across which the synchronous motor 28 is connected, the synchronous motor 28 rotates the drive shaft 32 at the rate of one revolution per minute. This in turn, causes the duration cam 34, the finger pressure cam 35, and the pawl actuating cam 36 to rotate at the rate of one revolution per minute.

Figure 4:
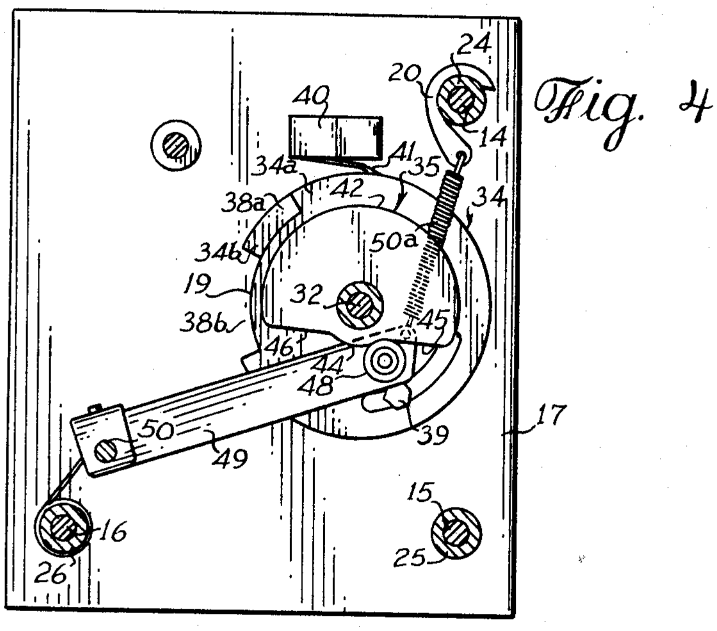
FIG. 4 is a sectional view taken substantially in line 4—4 in FIG. 2.

The positions of the cams 34, 35 and 36 are shown in the drawings as at the end of a complete revolution of the drive shaft 32. As the finger pressure cam 35 rotates from this position in a clockwise direction as viewed in FIG. 4, it causes the cam follower 48 to move up the fast rise portion 45 of the finger pressure cam 35. This forces the arm 49 downwardly and causes the finger pivot shaft 50 to rotate the bracket 109 and its flange 110 in a clockwise direction as viewed in FIG. 3. Rotation of the flange 110 results in the springs 108 being stretched and in the fingers 101 pivoting on the finger pivot shaft 50 toward the drum 96.

It will be understood that with a tape T on the drum 96, this pivoting of the fingers 101 will be checked when the tips 102 of the fingers 101 strike the tape T under pressure. It will also be understood that prior to this pivoting motion of the fingers 101, the position of the bracket 109 as its flange 110 engages the check surfaces 106' holds the fingers 101 retracted from the tape T.

The finger motion resulting from the fingers 101 striking the tape T is not sufficient for the finger nodes 104 to cause the operating levers 115 to close the microswitches 114. However, a perforation in the tape T corresponding with the tip 102 of a finger 101 permits the tip 102 to pass through the tape T into a channel 100 and this additional motion of a finger 101 is sufficient to close the microswitch 114 with which the finger 101 is associated.

This urging of the fingers 101 toward or through the tape T by the springs 108 continues as the cam follower 48 follows the high dwell portion 42 of the finger pressure cam 35. The pawl actuating cam 36 is positioned on the drive shaft 32 relative to the finger pressure cam 35 so that as the finger pressure cam 35 is causing the fingers 101 to engage or extend through the tape T, the pawl actuating cam 36 is not initially engaging the cam follower 59. This is because the pawl actuating cam 36 is rotating in a counterclockwise direction as viewed in FIG. 5 and because the cam follower 59 and the arm 60 are held away from the pawl actuating cam 59 by the set screw 72.

However, as the cam follower 48 continues to follow the high dwell portion of 42 of the finger pressure cam 35, the fast rise portion 51 of the pawl actuating cam 36 starts to engage the cam follower 59 and force the arm 60 downwardly. This downward motion of the arm 60 moves the pawl actuator 65 and pawl flange 66 downward. As the pawl actuating cam 36 continues to move the pawl flange 66 downwardly, the cam follower 48 reaches the fast fall portion 46 of the finger pressure cam 35. This causes the cam follower 48 to move upward and to rotate the finger pivot shaft 50 and the bracket 109 in a counterclockwise direction as viewed in FIG. 3. As a result the flange 110 of the bracket 109 engages the check surfaces 106' of the fingers 101 and forces the fingers 101 to pivot about the finger pivot shaft 50 away from the tape T.

Subsequent to this pivotal motion of the fingers 101 away from the tape T, the cam follower 59 reaches the end of the fast rise portion of the pawl actuating cam 36. When this occurs the pawl actuator 65 has moved downwardly to an extent sufficient to place the pawl flange 66 below that tooth on the ratchet wheel 68 which was immediately below that pawl flange 66 before the pawl actuator 65 started to move downwardly in response to the rotation of the pawl actuating cam 36.

Continuing rotation of the pawl actuating cam 36 causes the cam follower 59 to pass to the relief surface 52 and as a result, the arm 60 and the pawl actuator 65 move upwardly. The upward motion of the pawl actuator 65 causes the ratchet wheel 68 to be rotated in a counterclockwise direction as viewed in FIG. 5 by the pawl flange 66. This rotation of the ratchet wheel 68 is stopped when the stop 72 strikes the flange 72' and the stop 72 is pressure cam 35 and the pawl actuating cam 36 so that T is advanced by a length selected to correspond to one minute of time.

The duration cam 34 is positioned relative to the finger pressure can 35 and the pawl actauting cam 36 os that cam follower 41 drops into both recesses **38*a* and 38*b* while the cam follower 48 is on the high dwell portion 42 of the finger pressure cam 35. Thus, the duration switch 40 is closed only while the fingers 101 are being urged toward or through the tape T and the length of time during which the duration switch 40 is closed is dependent upon the relationship between the recesses 38*a* and 38*b***.

It will now be understood that rotation of the drive shaft 32 causes the tape T to be advanced by the ratchet wheel once each minute while the fingers 101 are retracted away from the tape T and after each advance of the tape T, the fingers move to engage or extend through the tape T while the tape T is stationary. It will also be understood that if a finger extends through the tape T, the microswitch 114 corresponding to the finger 101 is closed and that if the control switch 133 and duration switch 40 are closed, a circuit will be established between an output terminal 166 of the input terminal block 162 and an input terminal 167 of the output terminal block 163.

This circuit is made a portion of a circuit through any electrically operated device such as a bell signal S by simply connecting the bell signal S between the appropriate output terminal 168 of the output terminal block 163 and the lead 130' with a lead 137 and by connecting the lead 133 to that output terminal 166 corresponding to the lead 131'. Thus, the presence of a perforation through which a finger 101 passes will cause the bell signal S to operate for a period of time and at the particular instant determined by the relationship between the recesses **38*a* and 38*b*. As many bell signals S may be operated in response to perforations in the tape T as there are microswitches 114 and fingers 101 and if the bell signals S require greater or less voltage than that applied across leads 130' and 131' to operate the synchronous motor 28, it is simply necessary to attach the leads 133 and 137 to a separate source (not shown) for the greater or lesser voltage. It will be understood that operation of the pushbutton 138 permits manual operation of a bell signal S at any time. The length of the tape T will vary in accordance with the time pattern in which it is desired to operate devices such as the bell signals S. However, the tape T most frequently is sufficiently long for it to be advanced once each minute over a twenty-four hour period without repetition and then repeat. To load the tape T in the magazine 90, the continuous tape T is rolled as shown in full line in FIG. 3 and loaded into the magazine 90. A loop is placed in the channel 91 to extend around the drum 96 and return to the magazine 90 with appropriate slots engaging the sprockets 98 and 99 so the drum 96 can drive the tape T. As the invention operates and the tape T is passed around the drum 96, the tape T spreads throughout the magazine 90 in a random serpentine pattern, a portion of which is indicated in broken line in FIG. 3. This random pattern is always assumed by the tape T and it has been found that with the magazine 90 here shown, the tape T can be run even at extremely high speeds without becoming entangled. This is because the tape T is maintained in vertical alignment by the magazine 90 and because the tape T is fed into the random arrangement at the upper end of the magazine 90 and fed from the random arrangement at the lower end of the magazine 90 at the same speed by a single ratchet wheel 68**.

In loading tape T into the magazine 90, the handle 85 is moved to the left as viewed in FIG. 5. This causes the handle 85 to engage the finger 76 of the arm 74 and rotate the finger retracting shaft 73. As previously described, rotation of the finger retracting shaft 73 causes the crank portion 120 to engage the projections 106 of the fingers 101 and rotate the tips 102 of fingers 101 away from the drum 96. This allows the tape T to slide easily into position on the drum 96. The motion of the handle 85 also causes the pawl 81 to engage the actuator plate 182 so as to force the pawl actuator 65 downwardly. This moves the pawl flange 66 away from the ratchet wheel 68. Thus, the ratchet wheel may be freely rotated by a knob 97 so as to position the tape T in any desired position.

It will thus be seen that the circuit control device of the present invention provides a rugged, simple and durable device. To design a program, the tape T is simply punched at the desired locations. Various indicia may be printed on the tape to indicate where to punch. For example, the tape may be printed at one minute intervals. Changing of programs is quick and easy, and an override button 139 is provided for deviations from the set program. Moreover, a tape T may be used for extended periods because the finger 101 does not engage the tape T as it moves.

What is claimed is:

1. In a tape magazine for storing a tape having a substantially constant width transverse to its lengthwise centerline and arranged for operative association with a feed means for moving said tape; said magazine including substantially parallel walls positioned to define a space substantially equal in width to said width of said tape; a bottom member extending between said parallel walls and positioned so that said tape within said space rests on said bottom member; guide means for guiding said tape upwardly from adjacent said bottom member, said guide means including an inner wall positioned in close proximity to a side member to define a tape guide channel; and displacing means for separating said tape from said bottom member before said tape enters said channel as said tape is moved by said feed means.

2. The tape magazine of claim 1 in which said displacing means includes a platform member positioned between said side member and said bottom member and in which an extension of said inner wall is positioned over said platform member to extend said tape guide channel over said bottom member.

3. The tape magazine of claim 1 in which said feed means is positioned adjacent the upper end of said tape guide channel.

4. The tape magazine of claim 3 in which said feed means is a rotatable drum.

5. The tape magazine of claim 4 including a second guide means for guiding said tape from said tape guide channel toward said drum.

6. The tape magazine of claim 5 including a third guide means for guiding said tape from said drum into said space above said bottom member and laterally of said tape guide channel.

7. The tape magazine of claim 6 in which said side member is a first side member and including a second side member positioned parallel to said first side member.

8. The tape magazine of claim 7 in which said first side member, said second side member, and said bottom member, and said third guide means are positioned relative to each other so that tape entering said space through said third guide means is disposed in said space in a random serpentine manner.

References Cited

UNITED STATES PATENTS

| | | | |
|---|---|---|---|
| 2,679,394 | 5/1954 | Lear | 226—118 |
| 3,072,311 | 1/1963 | Cohen | 226—118 X |

RICHARD A. SCHACHER, Primary Examiner